United States Patent [19]

Nagase et al.

[11] Patent Number: 5,442,504
[45] Date of Patent: Aug. 15, 1995

[54] HEAD SUPPORTING DEVICE OF MAGNETIC DISK SYSTEM

[75] Inventors: Fumio Nagase, Tama; Jiro Ueki, Fuchu, both of Japan

[73] Assignee: Teac Corporation, Japan

[21] Appl. No.: 246,576

[22] Filed: May 20, 1994

Related U.S. Application Data

[63] Continuation of Ser. No. 889,492, May 27, 1992, abandoned.

[30] Foreign Application Priority Data

May 30, 1991 [JP] Japan .............................. 3-040020 U

[51] Int. Cl.⁶ .......................... G11B 5/105; G11B 5/49
[52] U.S. Cl. .................................................... 360/104
[58] Field of Search ................ 360/104, 105; 156/257, 156/268

[56] References Cited

U.S. PATENT DOCUMENTS

| | | | |
|---|---|---|---|
| 2,409,759 | 10/1946 | Hosking | 156/153 |
| 4,700,250 | 10/1987 | Kuriyama | 360/104 |
| 4,819,108 | 4/1989 | Seki et al. | 360/104 |
| 4,985,097 | 1/1991 | Matsumura et al. | 156/257 |

FOREIGN PATENT DOCUMENTS 246973 11/1986 Japan .
0145568 6/1987 Japan .

OTHER PUBLICATIONS

IBM Technical Disclosure Bulletin, "Floating Retention of Gimbal Spring", vol. 29, No. 5, Oct. 1986.

Primary Examiner—Stuart S. Levy
Assistant Examiner—George J. Letscher
Attorney, Agent, or Firm—Andrus, Sceales, Starke & Sawall

[57] ABSTRACT

A head supporting device includes an arm on which an upper magnetic head of a magnetic disk system is mounted, the arm having an adhesion surface to which a first adhesive agent and a second adhesive agent are applied, a carriage on which a lower magnetic head of the system is mounted, the carriage having an adhesion surface to which the first and second adhesive agents are applied, a first gimbal for connecting the upper magnetic head to an internal circuit of the system, the first gimbal having a first adhesion surface so that the first gimbal along with the upper magnetic head attached thereto is fixed to the arm by the first and second adhesive agents, and a second gimbal for connecting the lower magnetic head to the internal circuit, the second gimbal having a second adhesion surface so that the second gimbal along with the lower magnetic head attached thereto is fixed to the carriage by the first and second adhesive agents. In this head supporting device, the adhesion surface of the arm and the first adhesion surface include diagonally cut grooves so that the first adhesive agent flows in the grooves so as to evenly spread over the adhesion surface of the arm and the first adhesion surface, and the adhesion surface of the carriage and the second adhesion surface include diagonally cut grooves so that the first adhesive agent flows in the grooves so as to evenly spread over the adhesion surface of the carriage and the second adhesion surface.

8 Claims, 5 Drawing Sheets

HEAD SUPPORTING DEVICE OF MAGNETIC DISK SYSTEM

This application is a continuation application of Ser. No. 07/889,492, filed May 27, 1992, now abandoned.

BACKGROUND OF THE INVENTION

(1) Field of the Invention

The present invention generally relates to a head supporting device of a magnetic disk system, and more particularly to a device for supporting a magnetic head in a magnetic disk system so as to position the magnetic head with high positioning accuracy.

(2) Description of the Prior art

Recently, a magnetic disk containing a large quantity of information at a high packing density has become popular and been widely used for recording and reproducing information. In order to easily and safely use such a magnetic disk, it is necessary that a magnetic head be positioned with high accuracy in a magnetic disk system in a manufacturing stage of the magnetic disk system. The magnetic head of the magnetic disk system has a surface which slides on a magnetic disk (which is inserted by a user into the system). This magnetic head is a dual-surface type head, the magnetic head having an upper magnetic head with a surface positionable on a front-side surface of the magnetic disk, and having a lower magnetic head with a surface positionable on a reverse-side surface of the magnetic disk. The upper magnetic head is mounted on an arm member of the system, and the lower magnetic head is mounted on a carriage member of the system. In this magnetic disk system, it is necessary to support the upper and lower magnetic heads by means of an appropriate head supporting device so as to be able to position the heads with high accuracy.

Thus, when the magnetic disk system is manufactured, it is desirable that an upper gimbal to which the upper magnetic head is attached be mounted on the arm member and accurately fixed by an adhesive agent at a prescribed position, and that a lower gimbal to which the lower magnetic head is attached be mounted on the carriage member and accurately fixed by an adhesive agent at a prescribed position. It is also desirable that, after the gimbals are temporarily fixed to the carriage and the arm, no positional deviation of the gimbals from the prescribed positions occurs due to the temporary fixing of the gimbals by the adhesive agent at the prescribed positions and due to changes in the ambient temperature in the surrounding environment, thus allowing the upper and lower magnetic heads in the magnetic disk system to be positioned with high accuracy. The above mentioned deviation is detrimental to accurate positioning of the magnetic heads of the magnetic disk system.

Conventionally, there is a magnetic head supporting device which incorporates an improved fixing method so as to meet the above described requirements. For example, Japanese Laid-Open Patent Publication No.61-246973 discloses such a fixing method which is applicable to a magnetic disk system. The disclosed method includes a first fixing step and a second fixing step. In the first fixing step, a lower gimbal is temporarily fixed to a carriage at a given position by applying a first adhesive agent, and an upper gimbal is temporarily fixed to an arm at a given position by applying the first adhesive agent. The first adhesive agent used is capable of being cured in a very short time.

The carriage or the arm is formed with an adhesion surface to which an adhesive agent is applied so as to fix the carriage or the arm to the lower or upper gimbal by the adhesive agent. The carriage or the arm is also formed so as to have an inlet opening into which an adhesive agent is injected, and a number of grooves connecting the inlet opening to the adhesion surface. In the second fixing step, a second adhesive agent (e.g., an epoxy based adhesive) requiring a relatively long time to be cured is heated so as to decrease its viscosity, and the second adhesive agent is then injected into each inlet opening to spread over the adhesion surface so as to fix the gimbals to the carriage and to the arm.

However, it is difficult for an adhesive agent to evenly spread over each surface of the upper and lower gimbals because the carriage and the lower gimbal, as well as the arm and the upper gimbal, have an extremely flat surface therebetween and when the two surfaces are attached together they show a relatively high adherence. Thus, in the case of the above described prior art, there is a problem in that the first adhesive agent for temporary fixing the gimbals does not evenly spread over the surfaces of the upper and lower gimbals, partially because, if the amount of the adhesive agent is insufficient, a necessary adherence strength is not produced, and partially because, if the amount of the agent is excessive, a relatively long curing time is required in the manufacturing process. The excessive amount of the first adhesive agent cannot be cured sufficiently, thereby the workability of the system in the manufacturing process deteriorates. Thus, the upper and lower gimbals temporarily fixed by the first adhesive agent occasionally deviate from their given positions due to the amount of the first adhesive agent being too small and due to the agent being insufficiently cured.

The above mentioned grooves perform the second fixing step in which the second adhesive agent is injected into the inlet openings to spread over the adhesion surfaces of the carriage and the arm. Generally, a viscosity of the second adhesive agent such as an epoxy based adhesive is higher than a viscosity of the first adhesive agent used for the temporary fixing of the gimbles. Also, even when heated, the viscosity of the second adhesive agent is not easily lowered to a level low enough to allow the second adhesive agent to evenly spread over the adhesion surfaces. Thus, if the above grooves have a fluid passage with a relatively large sectional area, the second adhesive agent does not easily flow through the grooves into the adhesion surfaces in the second fixing step. For example, in the above described prior art, each of the grooves is 0.5 mm wide and 0.1 mm deep.

Moreover, to fix the lower gimbal to the carriage and the upper gimbal to the arm in the second fixing step, a relatively large amount of the second adhesive agent is needed because the grooves formed in the carriage or the arm have a relatively large sectional area. Thus, there is a problem in that the second adhesive agent needs a relatively long time to be cured and additional time is necessary in the manufacturing process of the magnetic disk system.

SUMMARY OF THE INVENTION

Accordingly, it is a general object of the present invention to provide an improved head supporting device in which the above described problems are eliminated.

Another and more specific object of the present invention is to provide a head supporting device in which a first adhesive agent evenly spreads over adhesion areas of mounting surfaces of a carriage, an arm, an upper gimbal and a lower gimbal so as to form a thin layer of the first adhesive agent, the upper and lower gimbals thus being quickly and reliably fixed to, respectively, the arm and the carriage by the first adhesive agent. Still another object of the present invention is to provide a head supporting device in which a positional deviation of the gimbals from prescribed positions does not easily occur after the gimbals are temporarily fixed to the arm and to the carriage by the first adhesive agent. The above mentioned objects of the present invention are achieved by a head supporting device which includes an arm on which an upper magnetic head is supported, the arm including an adhesion surface to which a first adhesive agent for temporary fixing and a second adhesive agent for final fixing are applied, a carriage on which a lower magnetic head is supported, the carriage including an adhesion surface to which the first and second adhesive agents are applied, a first gimbal connecting the upper magnetic head to an internal circuit of a magnetic disk system, the upper magnetic head being attached to the first gimbal, and the first gimbal having a first adhesion surface so that the first gimbal is fixed to the arm by the first and second adhesive agents applied to the first adhesion surface, and a second gimbal connecting the lower magnetic head to the internal circuit, the lower magnetic head being attached to the second gimbal, and the second gimbal having a second adhesion surface so that the second gimbal is fixed to the carriage by the first and second adhesive agents applied to the second adhesion surface. In this head supporting device, the adhesion surface of the arm and the first adhesion surface of the first gimbal include a plurality of grooves formed therein so that the first adhesive agent flows in the grooves so as to evenly spread over the adhesion surface of the arm and the first adhesion surface, and the adhesion surface of the carriage and the second adhesion surface of the second gimbal include a plurality of grooves formed therein so that the first adhesive agent flows in the grooves so as to evenly spread over the adhesion surface of the carriage and the second adhesion surface through the grooves. According to the present invention, the plurality of grooves having either a parallel cut pattern or a crosshatch cut pattern is formed in each of the adhesion surfaces of the arm, the first gimbal, the carriage and the second gimbals whereby the applied adhesive agent flows in the grooves so as to evenly spread over the adhesion surfaces and to form a thin layer of the adhesive agent. Thus, the first and second gimbals are quickly and reliably fixed to the carriage and to the arm by the first adhesive agent. Also, after the gimbals are temporarily fixed to the carriage and to the arm by the first adhesive agent, a positional deviation of the gimbals from prescribed positions on the adhesion surfaces does not easily occur.

Other objects and further features of the present invention will become apparent from the following detailed description when read in conjunction with the accompanying drawings

DESCRIPTION OF THE PREFERRED EMBODIMENTS

A description will now be given of a magnetic disk system to which a head supporting device of the present invention is applied, with reference to FIGS. 6 and 7. This magnetic disk system generally has a dual-surface type magnetic head, a carriage 12, a guide shaft 13 for guiding a horizontal reciprocating movement of the carriage 12 along an axis of the guide shaft 13, an arm 14 supported on the carriage 12 and vertically rotatable around a horizontal axis, and a holder 15 for retaining the arm 14 on the carriage 12.

Figure 6:
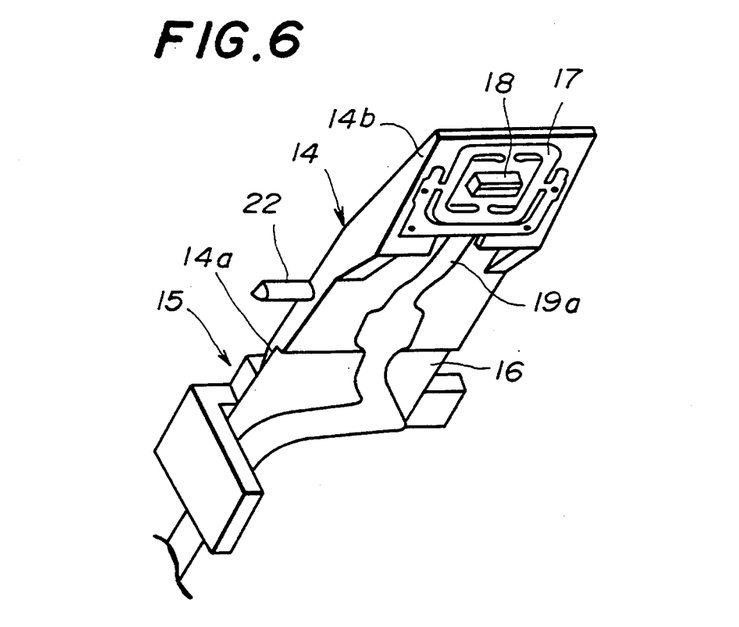
FIG. 6 is a perspective view showing a construction of the arm of the magnetic disk system to which the present invention is applied.

In FIG. 6, the arm 14 of the magnetic disk system is shown, and this arm 14 has a base portion 14a and an end portion 14b. A leaf spring 16 is attached to the arm 14 and secured onto a bottom surface of the base portion 14a. An upper gimbal 17 is also attached to the arm 14 and fixed onto a bottom surface of the end portion 14b. This upper gimbal 17 corresponds to the second gimbal of the present invention. An upper magnetic head 18 is provided in the middle of the upper gimbal 17 on the bottom surface of the end portion 14b of the arm 14. This upper magnetic head 18 corresponds to the second magnetic head of the present invention. A flexible printed circuit board (not shown) is provided in the magnetic disk system, and this board has an end portion 19a electrically connected to the upper magnetic head 18, and another end portion electrically connected to an internal circuit of the magnetic disk system. In addition, a hook portion 22 sidewisely extending from a side surface of the arm 14 is provided. When the upper magnetic head 18 is separated from a magnetic disk (not shown), this hook portion 22 is placed in contact with a disk holder (not shown) so as to upwardly rotate the arm 14.

Figure 7:
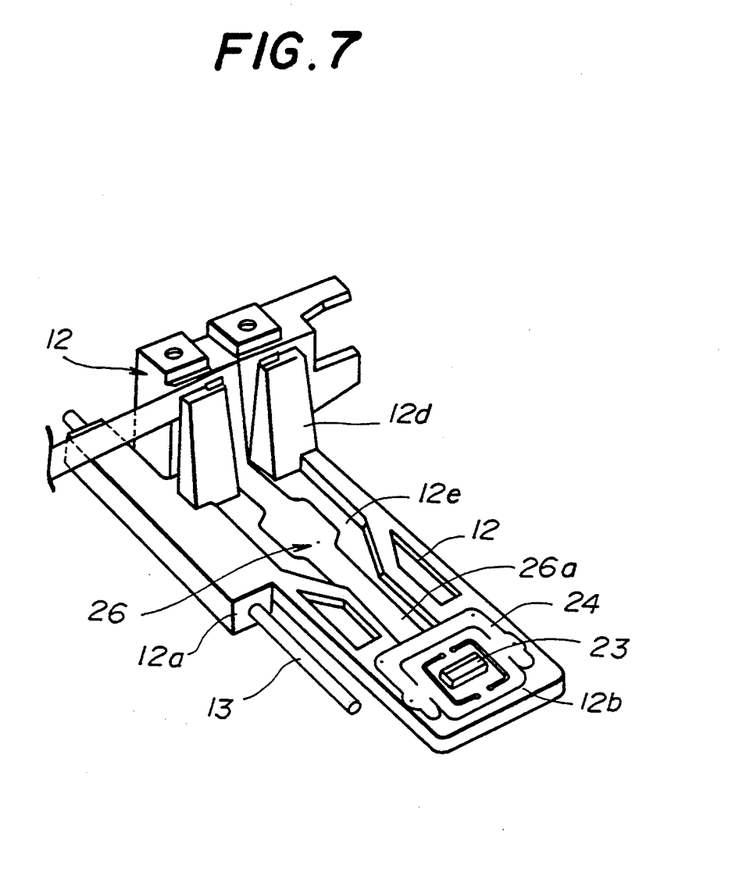
FIG. 7 is a perspective view showing a construction of the carriage of the magnetic disk system to which the present invention is applied.

In FIG. 7, the carriage 12 of the magnetic disk system is shown, and this carriage 12 includes a bearing portion 12a, an end portion 12b, a fixing portion 12c, a pair of supporting stands 12d, and a recessed portion 12e provided between the end portion 12b and the fixing portion 12c. The guide shaft 13 is inserted into the bearing portion 12a so that the carriage 12 is slidably supported on the guide shaft 13. A lower gimbal 24 is attached to the carriage 12 and fixed onto a top surface of the end portion 12b. This lower gimbal 24 corresponds to the first gimbal of the present invention. A lower magnetic head 23 is provided in the middle of the lower gimbal 24 on the top surface of the end portion 12b of the carriage 12. This lower magnetic head 23 corresponds to the first magnetic head of the present invention. The fixing portion 12c secures an end portion of the leaf spring 16 to the carriage 12 by means of a suitable mounting fastener, and the leaf spring 16 secured by the fixing portion 12c is supported on the supporting Stands 12d. Also, a flexible printed circuit board 26 is provided on the carriage 12, and this board 26 is inserted in the recessed portion 12e. The board 26 has an end portion 26a electrically connected to the lower magnetic head 23, and has the other end portion electrically connected to the internal circuit of the magnetic disk system.

Figure 1:
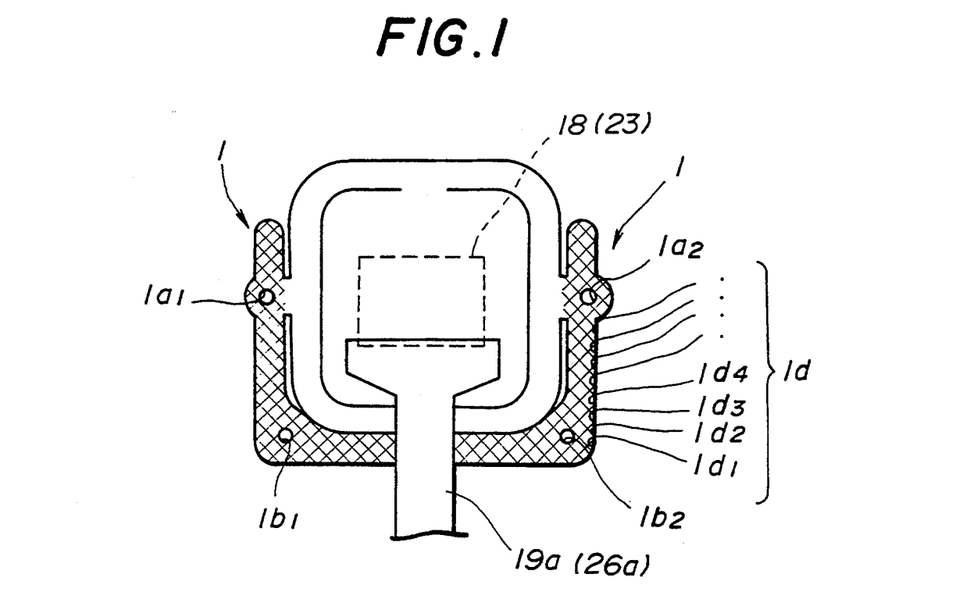
FIG. 1 is a view showing a mounting surface of a gimbal attached to a portion of an arm of a magnetic disk system or to a portion of a carriage thereof.

FIG. 1 shows an example of a mounting surface of a gimbal according to the present invention. More specifically, FIG. 1 shows either a top surface of the upper gimbal 17 fixed onto the bottom surface of the end portion 14b of the arm 14 shown in FIG. 6 or a bottom surface of the lower gimbal 24 fixed onto the top surface of the portion 12b of the carriage 12 shown in FIG. 7. The upper and lower gimbals 17 and 24 are made of a metal material, which material is, for example, stainless steel, phosphor bronze alloy, or beryllium copper alloy. The upper magnetic head 18 provided in the middle of the upper gimbal 17 and the lower magnetic head 23 provided in the middle of the lower gimbal 24 are, respectively, connected to the end portion 19a of the flexible printed circuit board and the end portion 26a of the flexible printed circuit board 26 in the recessed portion 12e of the carriage 12.

Each of the upper and lower gimbals 17 and 24 as shown in FIG. 1 is formed so as to have an adhesion area portion 1, a pair of locating holes 1a1, 1a2, and a pair of adhesive inlet holes 1b1, 1b2. The adhesion area portion 1 includes a plurality of grooves 1d (1d1, 1d2, . . . ) diagonally cut in the gimbal 17 and 24 in a cross-hatch cut pattern. Preferably, each of the grooves 1d are formed in the gimbals 17 and 24 so as to have an inter-groove pitch not smaller than 0.5 mm, a width not smaller than 0.1 mm and a depth greater than 0.015 mm and smaller than 0.025 mm. The depth of each groove is $\frac{1}{2}$ to $\frac{1}{3}$ times as great as a respective thickness of the gimbal 17 and 24.

Figure 2:
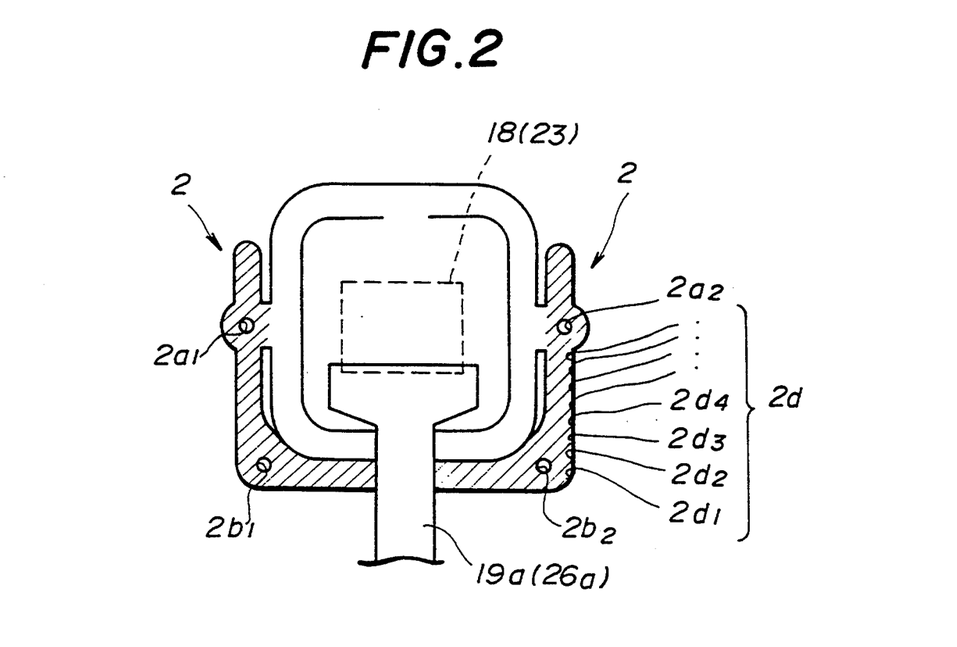
FIG. 2 is a view showing another mounting surface of the gimbal.

FIG. 2 shows another example of the mounting surface of the gimbal according to the present invention. Both of the upper gimbal 17 and the lower gimbal 24 shown in FIG. 2 is formed so as to have an adhesion area portion 2, a pair of locating holes 2a1, 2a2, and a pair of adhesive inlet holes 2b1, 2b2. The adhesion area portion 2 includes a plurality of grooves 2d (2d1, 2d2, . . . ) diagonally cut in the gimbal 17 and 24 in a parallel cut pattern. Other structural features of the gimbal shown in FIG. 2 are the same as those of the gimbal shown in FIG. 1 as mentioned above.

The grooves 1d and 2d in FIGS. 1 and 2 can be cut at the same time when the gimbals 17 and 24 are produced. For example, when an etching of the gimbals is performed, the grooves can be formed therein at the same time, and no additional manufacturing step is required. The locating holes 1a1, 1a2 (or 2a1, 2a2) shown in FIG. 1 (or FIG. 2) are provided so as to fit a pair of locating projections provided on the arm 14 or the carriage 12 when the upper gimbal 17 is attached to the arm portion 14b or when the lower gimbal 24 is attached to the carriage portion 12b. The adhesive inlet holes 1b1, 1b2 (or 2b1, 2b2) shown in FIG. 1 (or FIG. 2) are provided so that the first adhesive agent or the second adhesive agent can be injected into the holes.

Figure 3:
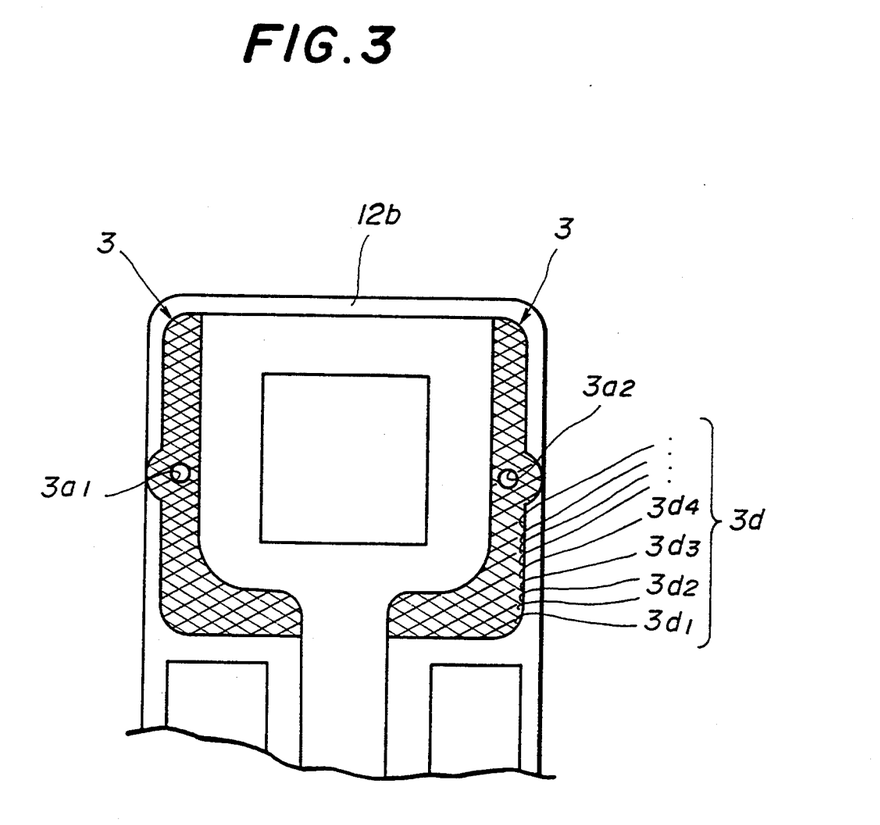
FIG. 3 is a view showing a portion of the carriage of the magnetic disk system, to which portion the gimbal is fixed by a first adhesive agent.
Figure 4:
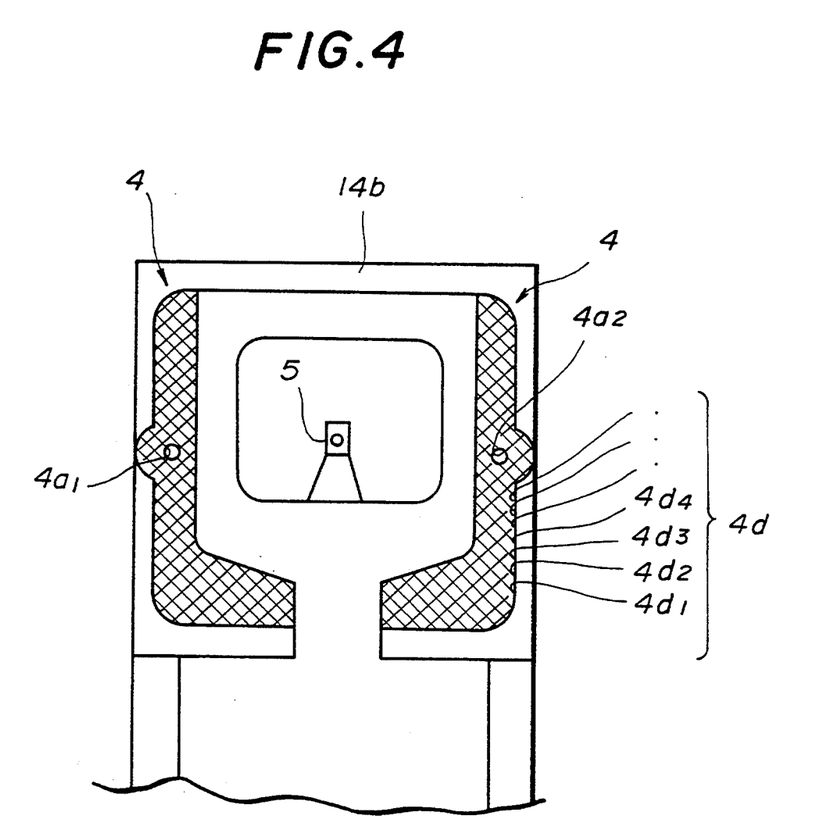
FIG. 4 is a view showing a portion of the arm of the magnetic disk system, to which portion the gimbal is fixed by a first adhesive agent.

FIG. 3 shows a mounting surface of the end portion 12b of the carriage 12, to which surface the lower gimbal 24 is attached by an adhesive agent. This mounting surface has a plurality of diagonally cut grooves 3d (3d1, 3d2, . . . ). FIG. 4 shows a mounting surface of the end portion 14b of the arm 14, to which surface the upper gimbal 17 is attached by an adhesive agent. This mounting surface also has a plurality of diagonally cut grooves 4d (4d1, 4d2, . . . ). Similarly to the above described grooves 1d, each of the grooves 3d and 4d of the carriage 12 and the arm 14 are formed so as to have an inter-groove pitch not smaller than 0.5 mm, a width not smaller than 0.1 mm, and a depth of 0.015 mm–0.025 mm. The carriage 12 and the arm 14 are made of synthetic resin, and they are formed by a prescribed forming process with such a material. Thus, the grooves 3d or 4d can be formed at the same time when the carriage and the arm are produced through the forming process, or by cutting the carriage and the arm after they are formed.

As shown in FIG. 3, the mounting surface of the carriage 12 includes a pair of locating recesses 3a1, 3a2. The locating recesses are easily placed onto the locating holes 1a1, 1a2 of the gimbal shown in FIG. 1 when the gimbal is mounted on the carriage 12. As shown in FIG. 4, the mounting surface of the arm 14 includes a pair of locating projections 4a1, 4a2 each having a leading edge having a substantially conical shape. The locating pins 4a1, 4a2 snugly fit in the locating holes 1a1, 1a2 of the gimbal when the gimbal is attached to the arm 14. It would be obvious to modify the shown embodiment so as to form the mounting surface of the arm with a pair of locating recesses instead of the above mentioned locating projections. In addition, the mounting surface of the arm 14 of FIG. 4 includes a pivot portion 5 on which the upper magnetic head 18 attached to the upper gimbal 17 is supported.

Next, a description will be given of an assembly process in which the upper and lower gimbals 17 and 24 are attached to the end portion 14b of the arm 14 and to the end portion 12b of the carriage 12, respectively, so that the gimbals are fixed thereto by the first and second adhesive agents, respectively.

It should be noted that the lower magnetic head 23 must be positioned with high accuracy, which head is firmly attached to the lower gimbal 24 on the carriage 12, because the lower magnetic head 23 must, be placed onto a significant section of the bottom surface (which is called the side-0 surface) of a magnetic disk inserted into the magnetic disk system. Thus, the lower gimbal 24 is then mounted on the carriage 12, and control of the accuracy with which the lower gimbal 24 is positioned is performed by means of a special optical inspection instrument.

More specifically, two positioning guide rods are inserted into the locating holes 1a1, 1a2 of the lower gimbal 24, and a leading edge of each of the guide rods is placed in contact with each of the locating recesses 3a1, 3a2 of the mounting surface of the carriage 12. The accuracy with which the lower gimbal 24 is positioned in this condition is checked by the optical inspection instrument, and then the lower gimbal 24 is attached to the mounting surface of the portion 12b of the carriage 12.

The upper gimbal 17, to which the upper magnetic head 18 is attached, is mounted on the mounting surface of the portion 14b of the arm 14 in such a manner that the locating holes 1a1, 1a2 of the upper gimbal 17 fit the locating projections 4a1, 4a2 of the mounting surface of the portion 14b of the arm 14. In the present embodiment, the adhesion area portion 1 of each of the gimbals 17 and 24 at this time mostly overlaps the adhesion area portion 4 of the end portion 14b of the arm 14 and with the adhesion area portion 3 of the end portion 12b of the carriage 12, respectively. On the other hand, there are exposed areas within the carriage 12 and within the arm 14 which are not covered with the upper and lower gimbals 17 and 24, respectively. For example, a leading edge of the end portion 14b of the arm 14 and a leading edge of the end portion 12b of the carriage 12 are the exposed areas as mentioned above which are not covered with the upper and lower gimbals 17 and 24, respectively, when the upper gimbal 17 is attached to the end portion 14b and the lower gimbal 24 is attached to the end portion 12b.

After the gimbals 17 and 24 are attached to the arm 14 and the carriage 12, respectively, the first adhesive agent for the first fixing is applied via the exposed areas mentioned above or injected from the adhesive inlet holes 1b1, 1b2 of the gimbals, and then applied to an adhesion area surface between the gimbal 17 and the arm 14, and then applied to an adhesion area surface between the gimbal 24 and the carriage 12. This first adhesive agent has a relatively low viscosity and a relatively short curing time, and it is, for example, a cyano-acrylate based adhesive. Since a capillary action is more likely to occur if the adhesive agent has a relatively low viscosity, the first adhesive agent easily flows in the grooves to evenly spread over the adhesion area portion 1 of each of the gimbals 17 and 24 through the grooves 1d, over the adhesion area portion 3 of the end portion 12b through the grooves 3d, and over the adhesion area portion 4 of the end portion 14b through the grooves 4d. Thus, the first adhesive agent permeates all the adhesion areas in the magnetic disk system. In this connection, the permeability of the first adhesive agent of the present invention is high enough that the first, temporary fixing of the upper and lower gimbals is achieved with high accuracy.

Therefore, the first adhesive agent is evenly placed into the adhesion area between the upper gimbal 17 and the end portion 14b and into the adhesion area between the lower gimbal 24 and the end portion 12b, and a very thin layer of the adhesive agent is formed due to the small dimensions of the grooves. Thus, only a small amount of the first adhesive agent is used and the time required for curing the first adhesive agent is short.

It should be noted that the depth and width of each of the grooves 1d (or 2d) formed on the upper and lower gimbals 17 and 24, the depth and width of each of the grooves 3d formed on the carriage 12, and the depth and width of each of the grooves 4d formed on the arm 14 are all very small, thus each of the fluid passages of the grooves has a small sectional area. However, since the first adhesive agent has a relatively low viscosity, it easily flows in the grooves so as to evenly spread over the adhesion area portions as mentioned above owing to the capillary action of the adhesive agent having a low viscosity. It should also be noted that adhesion areas of the first adhesive agent in the crosshatch cut grooves 1d shown in FIG. 1 are greater than adhesion areas of the first adhesive agent in the parallel cut grooves 2d shown in FIG. 2. Thus, if the upper and lower gimbals 17 and 24 are formed so as to have the crosshatch cut grooves 1d, the adhesive agent can have a greater adhesion strength.

After the upper gimbal 17 and the lower gimbal 24 are temporarily fixed to the end portion 14b and to the end portion 12b by the first adhesive agent, the second adhesive agent is applied to the gimbals 17 and 24 and to the carriage 12 and the arm 14 in such a manner that the applied agent projects from the adhesion surface at a boundary area between the periphery of the gimbal 17 and the exposed surface section of the end portion 14b, or at a boundary area between the periphery of the gimbal 24 and the exposed surface section of the end portion 12b. Thus, the second, final fixing of the gimbals 17 and 24 to the arm 14 and the carriage 12, respectively, is carried out. The second adhesive agent for the final fixing has a relatively high viscosity and a relatively long curing time.

Figure 5:
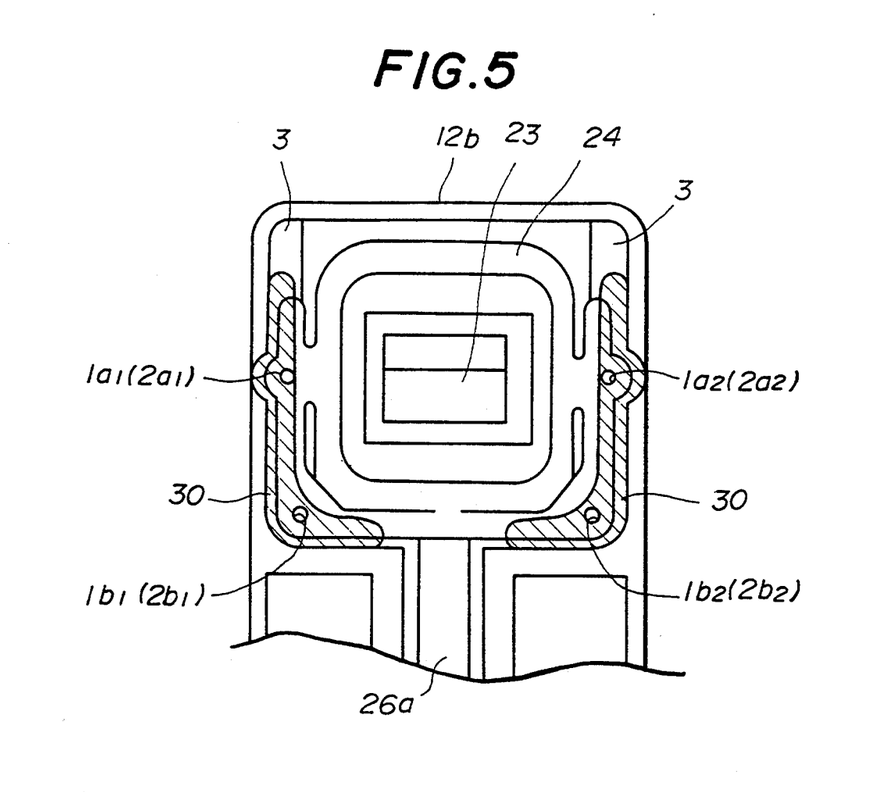
FIG. 5 is a view showing the portion of the carriage to which the gimbal having a lower magnetic head attached thereto is fixed by a second adhesive agent.

FIG. 5 shows the end portion 12b of the carriage 12, to which portion the lower gimbal 24 having the lower magnetic head 23 attached thereto is finally fixed by the second adhesive agent. In FIG. 5, the area where the second adhesive agent is applied is indicated by a shaded area 30. As indicated in FIG. 5, the second adhesive agent is applied to the adhesion area 30 in such a manner that the applied agent projects therefrom at the boundary area between the periphery of the gimbal 24 and the exposed surface section of the end portion 12b. The second fixing of the gimbal 17 to the end portion 14b is carried out substantially in the same manner as mentioned above, and a description thereof will be omitted. The second adhesive agent is preferably an optically setting resin based adhesive which is easily cured when being illuminated by ultra-violet ray. A projecting wall portion surrounding the mounting surface of the end portion 14b or surrounding the mounting surface of the end portion 12b is provided so as to prevent the applied second adhesive agent from dropping from the gimbals.

As described above, according to the present invention, the first adhesive agent easily flows in the grooves so as to evenly spread over the mounting surfaces, and thus the upper and lower gimbals are quickly and reliably fixed to the carriage and to the arm, respectively, by the first adhesive agent. Also, after the gimbals are temporarily fixed thereto by the first adhesive agent, a positional deviation of the gimbals from prescribed positions on the mounting surfaces does not easily occur, so that the upper and lower magnetic heads are positioned with high accuracy on the mounting surfaces of the carriage and the arm when being fixed by the second adhesive agent.

Further, the present invention is not limited to the above described embodiments, and variations and modifications may be made without departing from the scope of the present invention.

What is claimed is:

1. A device for supporting an upper magnetic head of a magnetic disk system and for supporting a lower magnetic head of the magnetic disk system, the upper magnetic head having a surface positionable on a top of a magnetic disk inserted in the magnetic disk system, the lower magnetic head having a surface positionable on a bottom of the magnetic disk, said device comprising:
   an arm on which said upper magnetic head is mounted, said arm having a longitudinal axis and an adhesion surface to which a first adhesive agent and a second adhesive agent are applied;

a carriage on which said lower magnetic head is mounted, said carriage having a longitudinal axis and an adhesion surface to which said first and second adhesive agents are applied;

a first gimbal for connecting said upper magnetic head to an internal circuit of said magnetic disk system, said upper magnetic head being attached to said first gimbal, and said first gimbal having an adhesion surface to which the adhesion surface of the arm is attached, so that the first gimbal is temporarily fixed to the arm by the first adhesive agent applied to the adhesion surface of the arm and finally fixed to the arm by a second adhesive agent applied to the adhesion surface of the arm; and a second gimbal for connecting said lower magnetic head to said internal circuit of said magnetic disk system, said lower magnetic head being attached to said second gimbal, and said second gimbal having an adhesion surface to which the adhesion surface of the carriage is attached, so that the second gimbal is temporarily fixed to the carriage by the first adhesive agent applied to the adhesion surface of the carriage and finally fixed to the carriage by the second adhesive agent applied to the adhesion surface of the carriage, wherein at least one of the adhesion surfaces of the arm and the first gimbal included a plurality of diagonally cut first grooves extending in a slanting direction relative to the longitudinal axis of the arm so that a portion of the first adhesive agent enters said first grooves so as to evenly spread over the adhesion surfaces of the arm and the first gimbal, wherein at least one of the adhesion surfaces of the carriage and the second gimbal includes a plurality of diagonally cut second grooves extending in a slanting direction relative to the longitudinal axis of the carriage so that a portion of the first adhesive agent enters said second grooves so as to evenly spread over the adhesion surfaces of the carriage and the second gimbal; and wherein said first and second gimbals are temporarily fixed to the arm and the carriage by applying the first adhesive agent to the adhesion surfaces of the arm and the first gimbal and to the adhesion surfaces of the carriage and the second gimbal, and said first and second gimbals are finally fixed to the arm and the carriage by applying the second adhesive agent to the adhesion surfaces of the arm and the first gimbal and to the adhesion surfaces of the carriage and the second gimbal so as to cover the first adhesive agent applied thereto, and whereby an applied second adhesive agent projects from a boundary area between the periphery of the gimbals and an exposed surface of an end portion of the arm and carriage.

2. A device according to claim 1, wherein said first and second grooves are formed in a crosshatch cut pattern in said at least one of the adhesion surfaces of the arm and the first gimbal and in said at least one of the adhesion surfaces of the carriage and the second gimbal, respectively.

3. A device according to claim 1, wherein said first and second grooves are formed in a parallel cut pattern in said at least one of the adhesion surfaces of the arm and the first gimbal and in said at least one of the adhesion surfaces of the carriage and the second gimbal, respectively.

4. A device according to claim 1, wherein said adhesion surface of said arm includes a pair of locating projections located at positions symmetrical with respect to a longitudinal centerline of said arm, said first adhesion surface of said first gimbal including a pair of locating holes in which said locating projections are fitted when said arm is attached to said first gimbal.

5. A device according to claim 1, wherein said adhesion surface of said carriage includes a pair of locating projections located at positions symmetrical with respect to a longitudinal centerline of said carriage, said second adhesion surface of said second gimbal including a pair of locating holes in which said locating projections are fitted when said carriage is attached to said second gimbal.

6. A device according to claim 1, wherein said first adhesion surface of said first gimbal includes a pair of inlet openings into which the first and second adhesive agents are injected so as to spread over said first adhesion surface.

7. A device according to claim 1, wherein said second adhesion surface of said second gimbal includes a pair of inlet openings into which the first and second adhesive agents are injected so as to spread over said second adhesion surface.

8. A device for supporting an upper magnetic head of a magnetic disk system and for supporting a lower magnetic head of the magnetic disk system, the upper magnetic head having a surface positionable on a top of a magnetic disk inserted in the magnetic disk system, the lower magnetic head having a surface positionable on a bottom of the magnetic disk, said device comprising:

an arm on which said upper magnetic head is mounted, said arm having an adhesion surface to which a first adhesive agent and a second adhesive agent are applied;

a carriage on which said lower magnetic head is mounted, said carriage having an adhesion surface to which said first and second adhesive agents are applied;

a first gimbal for connecting said upper magnetic head to an internal circuit of said magnetic disk system, said upper magnetic head being attached to said first gimbal, and said first gimbal having an adhesion surface to which the adhesion surface of the arm is attached, so that the first gimbal is temporarily fixed to the arm by the first adhesive agent applied to the adhesion surface of the arm and finally fixed to the arm by the second adhesive agent applied to the adhesion surface of the arm; and a second gimbal for connecting said lower magnetic head to said internal circuit of said magnetic disk system, said lower magnetic head being attached to said second gimbal, and said second gimbal having an adhesion surface to which the adhesion surface of the carriage is attached, so that the second gimbal is temporarily fixed to the carriage by the first adhesive agent applied to the adhesion surface of the carriage and finally fixed to the carriage by the second adhesive agent applied to the adhesive surface of the carriage, wherein at least one of the adhesion surfaces of the arm and the first gimbal includes a plurality of first grooves so that a portion of the first adhesive agent enters said first grooves so as to evenly spread over the adhesion surfaces of the arm and the first gimbal, wherein at least one of the adhesion surfaces of the carriage and the second gimbal includes a plurality of second grooves so that a portion of the first adhesive agent enters said second grooves so as to evenly spread over the adhesion surfaces of the carriage and the second gimbal, and wherein said first and second gimbals are temporarily fixed to the arm and the carriage by applying the first adhesive agent to the adhesion surfaces of the arm and the first gimbal and to the adhesion surfaces of the carriage and the second gimbal, and said first and second gimbals are finally fixed to the arm and the carriage by applying the second adhesive agent to the adhesion surfaces of the arm and the first gimbal and to the adhesion surfaces of the carriage and the second gimbal so as to cover the first adhesive agent applied thereto, and whereby an applied second adhesive agent projects from a boundary area between the periphery of the gimbals and an exposed surface of an end portion of the arm and carriage.

* * * * *